US007978736B2

(12) United States Patent
Jarabek et al.

(10) Patent No.: US 7,978,736 B2
(45) Date of Patent: Jul. 12, 2011

(54) EFFICIENT PROVISIONING OF A VT/TU CROSS-CONNECT

(75) Inventors: Andrew Jarabek, Ontario (CA); Aris Tombul, Ontario (CA); Karl Hammermeister, Ontario (CA)

(73) Assignee: Ciena Corporation, Linthicum, MD (US)

( * ) Notice: Subject to any disclaimer, the term of this patent is extended or adjusted under 35 U.S.C. 154(b) by 1241 days.

(21) Appl. No.: 10/675,462

(22) Filed: Sep. 30, 2003

(65) Prior Publication Data

US 2005/0068988 A1  Mar. 31, 2005

(51) Int. Cl.
*H04J 3/02* (2006.01)
*H04L 12/50* (2006.01)
(52) U.S. Cl. ........................................ 370/538; 370/369
(58) Field of Classification Search .................. None
See application file for complete search history.

(56) References Cited

U.S. PATENT DOCUMENTS

| 5,287,513 | A  | * | 2/1994  | Ferguson ...................... 370/360 |
| 6,498,794 | B1 | * | 12/2002 | Tsukamoto et al. ....... 370/395.1 |
| 2003/0053494 | A1 | * | 3/2003  | Mochizuki .................... 370/539 |
| 2004/0022239 | A1 | * | 2/2004  | Bosshart ....................... 370/369 |
| 2004/0100994 | A1 | * | 5/2004  | Miller .......................... 370/503 |
| 2005/0238063 | A1 | * | 10/2005 | Takuwa et al. ................ 370/538 |

* cited by examiner

*Primary Examiner* — Ricky Ngo
*Assistant Examiner* — Clemence Han
(74) *Attorney, Agent, or Firm* — Kent Daniels; Blake, Cassels & Graydon LLP

(57) ABSTRACT

A method and apparatus for efficient provisioning of a VT/TU cross-connect includes checking a state of a control bit that specifies whether to assemble an output from multiple virtual tributary (VT1.5/VT2) or tributary unit (TU11/TU12) connections or handle the output as an synchronous transport signal (STS) or administrative unit (AU-3/AU-4) connection, and switching a predetermined number of entries together based on a state of the control bit.

19 Claims, 4 Drawing Sheets

EFFICIENT PROVISIONING OF A VT/TU CROSS-CONNECT

BACKGROUND

This invention relates to cross-connect provisioning.

Synchronous data communications networks can carry payload data using, for example, the synchronous digital hierarchy (SDH) protocol or synchronous optical network (SONET) protocol. In each of these protocols, payload data is transported within synchronous payload envelopes (SPE's), in which the payload data is organized into rows. Typically, each row is subdivided into a plurality of data segments, each of which may comprise one or more bytes of data. For example, a virtual connection level 4 (VC-4) may include 63 tributary unit level 1, rate 2 signals (TU-12s) or 2 low order virtual connection level 3 signals (VC-3s) and 21 TU-12s. The VCs are transported across a network in frames known as synchronous transport module (STM) frames. Similarly a synchronous optical network (SONET) system carries data in high order structures known as synchronous transport signals (STS) or low order structures known as virtual tributaries (VTs). An STS-1 may comprise some combination of lower signals such as 28 VT1.5s or 21 VT2s, where VT2s are comparable with SDH TU-12s.

If a VT/TU cross-connect has the ability to cross-connect the overhead column in a SONET/SDH frame as well as the VT/TU data, the cross-connect can operate as an STS-1/VC-3 cross-connect. Cross-connects capable of switching STS-1/VC-3 are typically capable of switching any concatenated rate (e.g. STS-3c/VC-4 to STS-Nc/VC-4-Nc) or other integer multiple rate of 51.84 Mbps.

SUMMARY

In one aspect the invention features a method and apparatus for efficient provisioning of a VT/TU cross-connect. The method includes checking a state of a control bit that specifies whether to assemble an output from multiple virtual tributary (VT1.5/VT2) or tributary unit connections or handle the output as a synchronous transport signal (STS) connection or an administrative unit (AV-3/AV-4) connection, and switching a predetermined number of entries together based on a state of the control bit.

One of more of the following features may also be included. The control bit is set by a programmer. The method includes handling the output as an STS connection when the control bit is set and assembling the output from multiple VT connections when the control bit is not set or vice versa. The method includes storing the control bit in a connection memory or in a register.

The method includes checking a state of a second control bit associated with independent and concatenated payloads. The method includes cross-connecting a second payload with a first payload if the second control bit is set. The method includes storing the second control bit in a connection memory or a register. The method includes checking a state of the second control bit only if the first control bit is set.

One or more aspects of the invention may provide one or more of the following advantages.

In SONET or SDH systems the time taken to compute and apply connection maps to the switching device is significant. The use of a control bit indicating connections that should be treated as an STS structure reduces the complexity of a system and decreases the provisioning time.

To improve reliability of a network, in the event of a failure, such as a cut fiber optic or electrical cable between two or more network elements, a SONET or SDH system can be provisioned to use a redundant back-up route. Since data will be lost between the time of a failure and activation of the backup route or routes, it is key to be able to quickly apply connection maps to the switching devices in all the affected network elements.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
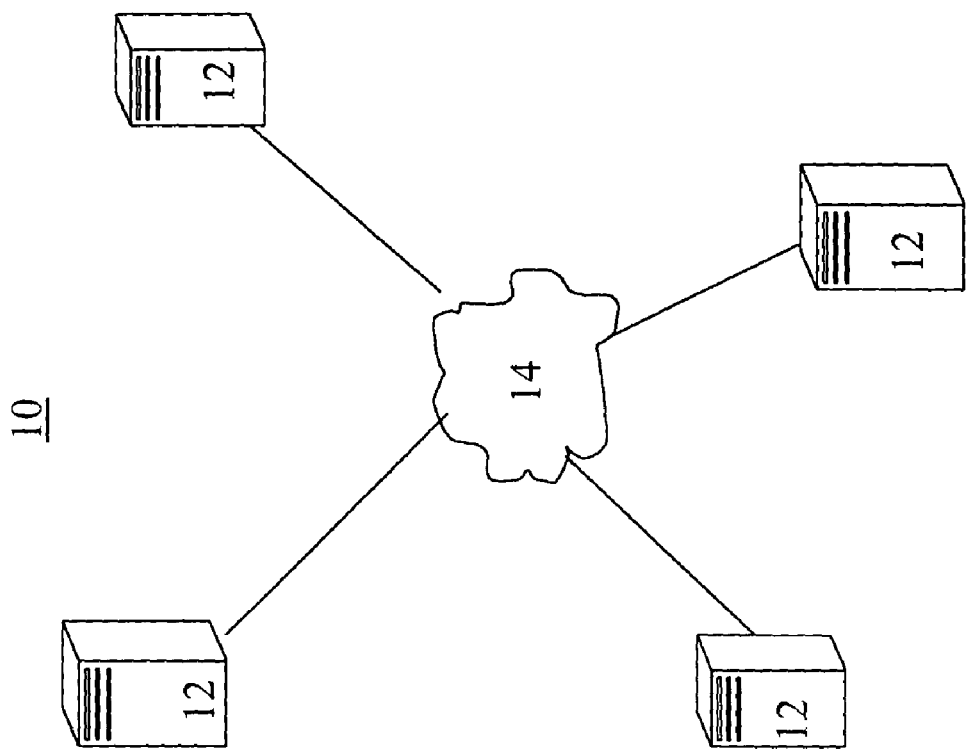
FIG. 1 is a block diagram of a network.

Referring to FIG. 1, a network 10 includes a plurality of network elements 12 in communication using a network infrastructure 14. The network infrastructure 14 may include network elements or nodes, and/or sub-networks. The network elements include synchronous transmission apparatus such as a multiplexer, a regenerator, or a cross-connect (not shown). In one example, the network can be a SONET and/or SDH network. Network elements 12 in network 10 switch data traffic. While the figures and descriptions use primarily terms associated with the SONET protocol and systems, it will be understood that other protocols and systems such as SDH can be used.

In SONET or SDH systems, the time taken to compute and apply connection maps to the switching device is non-negligible. In order to provision a VT cross-connect to pass through or cross-connect an STS signal, it is necessary to specify the STS signal as the aggregation of multiple VT connections and associated overhead. For example, a synchronous transport signal level 1 (STS-1) may include individual connection entries to be specified for the overhead bytes and the 28 virtual tributary type 1.5 (VT1.5) signals. A VT1.5 entry is a low-order SONET container and pointer capable of carrying a 1.5 Mbps signal. By provisioning a connection for the overhead columns and individual connections for each of the 28 VT1.5 signals within the STS-1 from a common source to a common destination, the cross-connect switches all columns of the SONET/SDH frame together as a large bulk signal. The cross-connect treats the bulk signal as 29 or more individual smaller signals that are traveling together.

An application specific integrated circuit (ASIC) provides cross-connection and overhead regeneration if required. The ASIC includes random access memory (RAM) that provides a cross-connection between a plurality of input ports and a corresponding plurality of output ports. An associated core logic controls the writing of incoming data to the RAM and subsequent reading of outgoing data from the RAM to provide cross-connection, format conversion, and channel reordering functionality.

Figure 2:
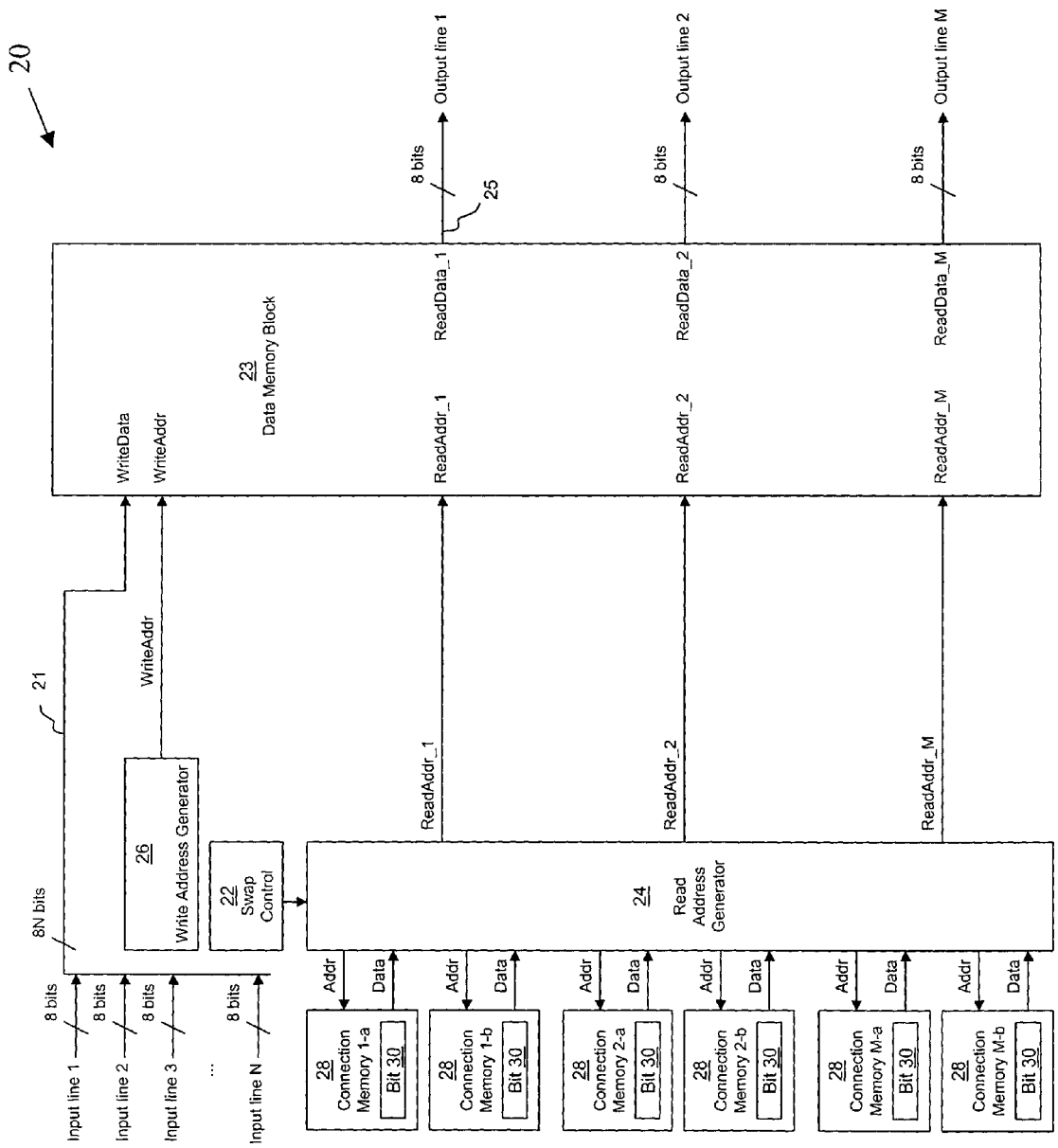
FIG. 2 is a block diagram of a switching core in an STS cross-connect.

Referring to FIG. 2, a slice of the switching core 20 includes a connection random access memory (RAM) 28 capable of storing one binary bit (control bit 30) of information for every STS output of a VT switch device. Control bit 30 specifies whether the output is assembled from multiple VT connections or is treated as an STS connection. The switching core also includes a memory block 23 that contains one or more RAMs for switching data. Connection RAM 28 controls writing and reading of data into and out of memory block 23. The slice of the switching core 20 also includes other blocks to manage the switching of data. For example, the switching core 20 includes a swap control module 22, a read address generator 24, and a write address generator 26.

In a VT switch that supports overhead switching, there are at least 29 entries per an STS-1 high level container (at least one entry for the overhead and one for each of the 28 VT1.5's low level container). A single control bit 30 added to the overhead connection entry (located in connection RAM 28) specifies the signal type. If control bit 30 is set, the switch determines that the 28 other connection entries in the STS-1 can be skipped, as all the entries should come from the same source as the overhead. Thus, the cross-connect switches the 29 entries of the STS-1 together. When control bit 30 is not set, the switch will process all connection entries (i.e. processes the pointer information for each VT entry).

While in this example, the control bit 30 was stored in the same memory element that stores the connection (i.e. connection RAM 28), control bit 30 could be stored in a different memory or a register. While in the above example setting the control bit 30 indicates STS type entries and not setting the control bit 30 indicates VT type entries, the state of control bit 30 could be reversed. If the state of the control bit is reversed, setting the control bit 30 indicates VT type entries and not setting the control bit 30 indicates STS type entries.

Control bit 30 can be set before the system is in use, or can be set while the cross-connect is in operation. To set the control bit 30 while in operation, a user sets the control bit 30 in the duplicate connection RAM 28 and swaps control of reading and writing to the duplicate connection RAM 28 using swap control module 22. This swapping provides flexibility in the system and allows a user to switch the expected signal type (indicated by the control bit 30) while the cross-connect is in operation.

Figure 3:
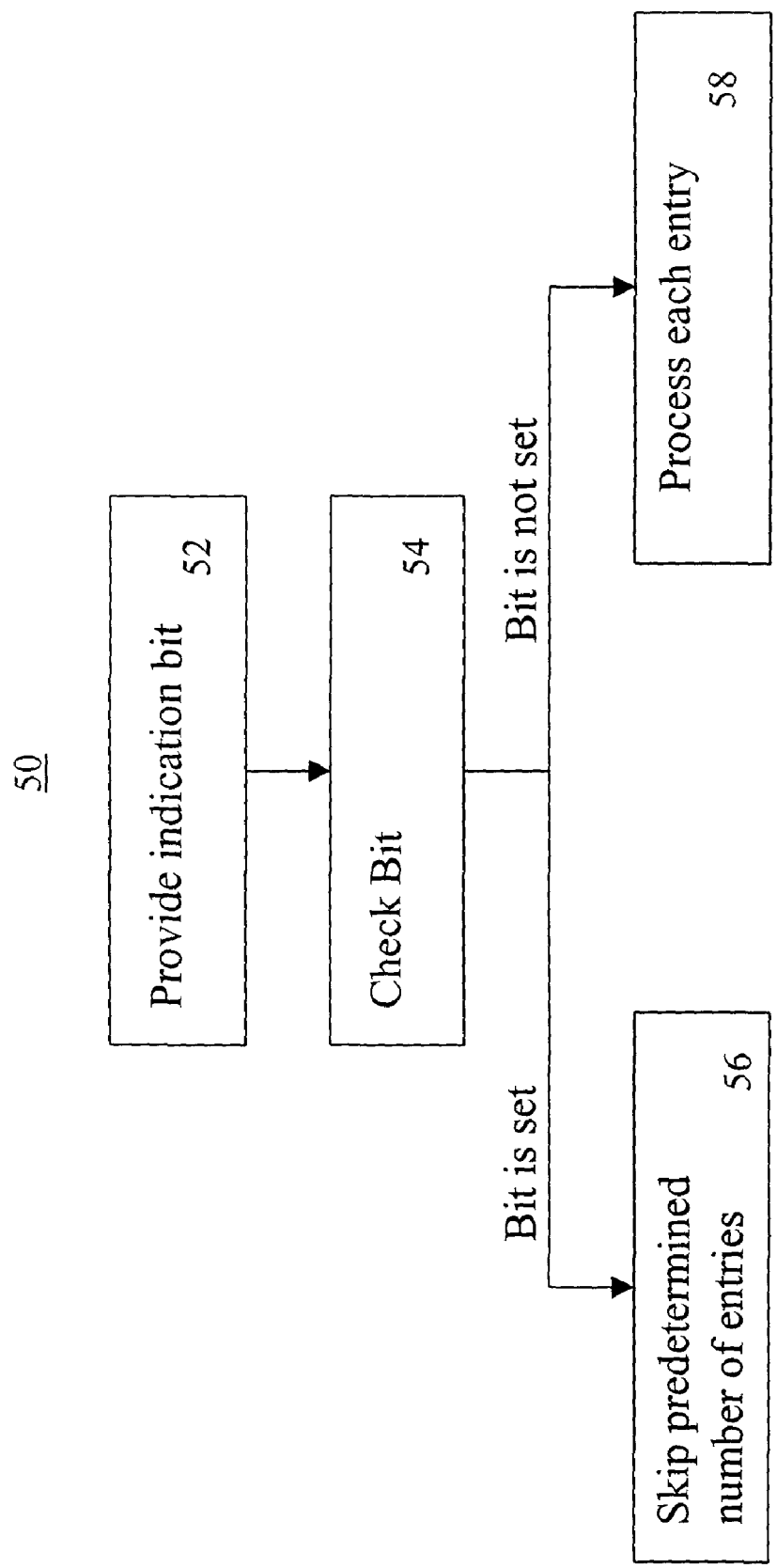
FIG. 3 is a flow chart of a process to switch entries based on a control bit.

Referring to FIG. 3, a process 50 includes providing (52) a control bit 30. A user sets control bit 30 in connection RAM 28. Subsequent to the control bit 30 being set, process 50 checks (54) the control bit 30. If the control bit 30 is set, process 50 skips (56) a predetermined number of entries and switches the entries together (i.e. does not process the connection information for each VT entry). If control bit 30 is not set, process 50 processes (58) each entry and determines the connections for each entry separately based on the connection information included in each VT entry.

Figure 4:
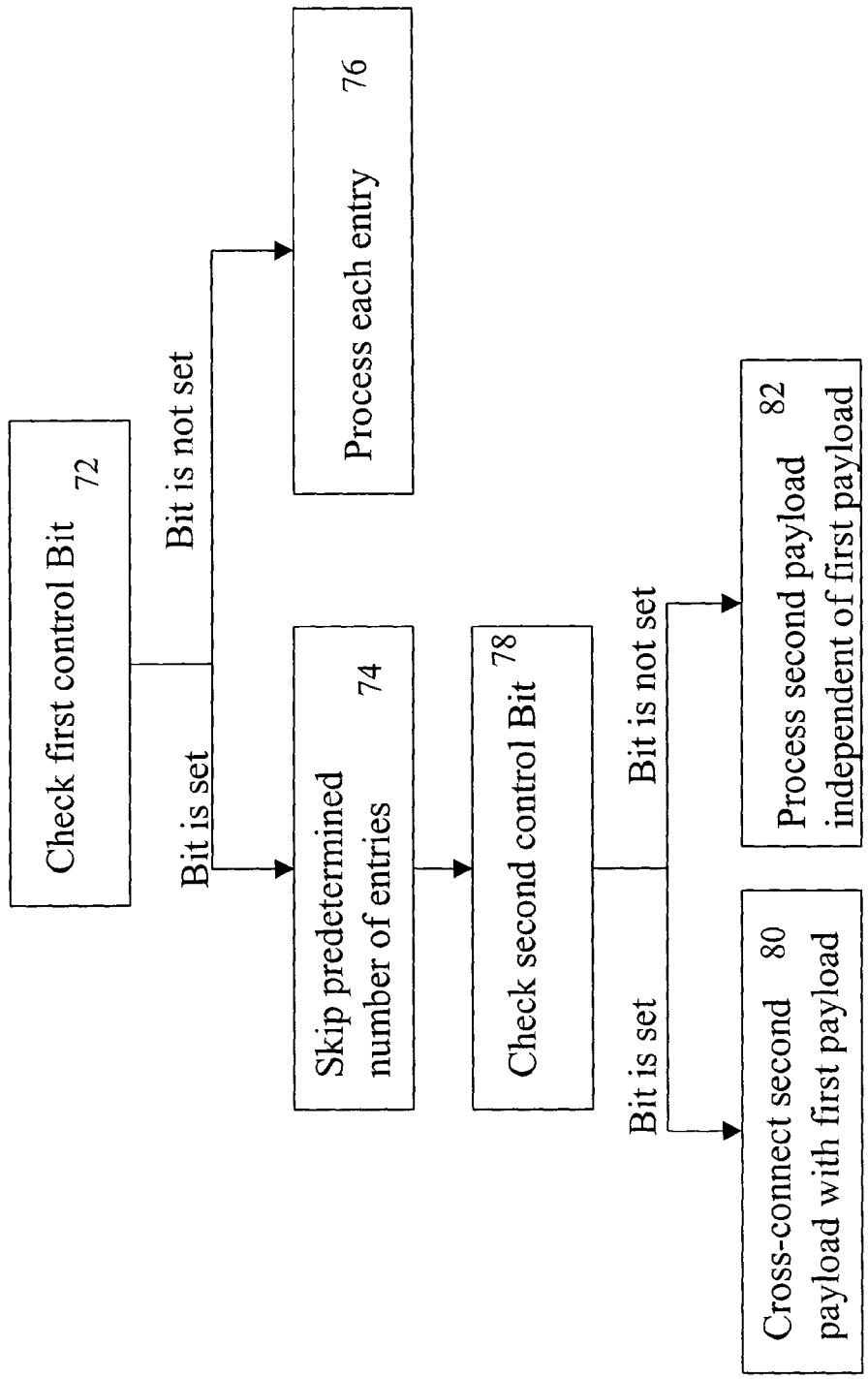
FIG. 4 is a flow chart of a process to switch payloads based on a control bit.

Referring to FIG. 4, the method described in relation to FIG. 3 extends to configurations where multiple payloads are concatenated and switched together. For example synchronous transport signal level N concatenated/Virtual connect level 43 N concatenated (STS-Nc/VC-4-Nc) type configurations. In this example, connection RAM 28 includes a first control bit 30 for distinguishing between STS-type or concatenated VT entries and a second control bit for distinguishing between independent and concatenated payloads. As shown in FIG. 4, a process 70 for switching independent and concatenated payloads includes checking (72) the first control bit 30. If the control bit 30 is set, process 70 skips (74) a predetermined number of entries and switches the entries together. If control bit 30 is not set, process 70 processes (76) each entry and determines the connections for each entry separately. Process 70 checks (78) the state of a second control bit. If the second control bit is set, process 70 switches (80) a second payload with the first payload. If the second control bit is not set, process 70 processes (82) the second payload independent of the first payload. If the first control bit 30 is not set, the state of the second control bit does not affect the switching.

For example, one type of STS-Nc is a synchronous transport level 3 concatenated (STS-3c). A STS-3c type signal has three concatenated STS-1 entries. To establish an STS-3c connection, the first and second control bits are set for the first connection indicating that the next STS-1 should also be cross-connected along with the first STS-1. The second STS-1 would also have the first and second control bits set indicating that the third STS-1 should follow the second STS-1 entry. The third STS-1 would have the first control bit set, but would not have the second control bit set, as it is the last in the chain. In this example, all three STS-1 entries forming the STS-3c entry are switched together based on the connection specified in the first STS-1 entry. Depending on the output signal rate, the switch accommodates concatenating signals within larger signal (such as one or more STS-3c signals within an STS-48), where the applicable standards which define an STS multiplexing and numbering scheme which results in non-adjacent signals being concatenated.

A number of embodiments of the invention have been described. Nevertheless, it will be understood that various modifications may be made without departing from the spirit and scope of the invention. Accordingly, other embodiments are within the scope of the following claims.

What is claimed is:

1. A method of processing an output signal comprising:
checking a state of a first control bit that specifies whether to assemble the output signal from multiple virtual tributary connections or handle the output signal as an synchronous transport signal (STS) or administrative unit (AU) connection;
switching a predetermined number of connection entries together based on the state of the first control bit;
storing the first control bit in a connection memory;
checking a state of a second control bit that is associated with independent and concatenated payloads; and
cross-connecting a second payload with a first payload if the second control bit is set.

2. The method of claim 1 wherein the first control bit is set by a programmer.

3. The method of claim 1 further comprising:
handling the output signal as an STS connection when the first control bit is set.

4. The method of claim 1 further comprising:
assembling the output signal from multiple VT/TU connections when the first control bit is not set.

5. The method of claim 1 further comprising:
handling the output signal as the AU connection when the first control bit is not set.

6. The method of claim 1 further comprising:
assembling the output signal from multiple VT connections when the first control bit is set.

7. The method of claim 1 further comprising storing the first control bit in a register.

8. The method of claim 1 further comprising:
processing a second payload independently of a first payload if the second control bit is not set.

9. The method of claim 1 further comprising storing the second control bit in the connection memory.

10. The method of claim 1 further comprising storing the second control bit in a register.

11. A core logic and memory for provisioning cross-connects in an output signal in network switching environment comprising instructions for causing a computer to:

check a state of a first control bit that specifies whether to assemble the output signal from multiple virtual tributary/tributary unit (VT/TU) connections or handle the output signal as an synchronous transport signal (8T8) or administrative unit (AU) connection;

switch a predetermined number of connection entries together based on the state of the first control bit;

store the first control bit in a connection memory;

check a state of a second control bit that is associated with independent and concatenated payloads; and cross-connecting a second payload with a first payload if the second control bit is set.

12. The memory of claim 11 wherein the first control bit is set by a programmer.

13. The memory of claim 11 further comprising instructions to store the first control bit in a register.

14. The memory of claim 11 further comprising instructions to store the second control bit in the connection memory.

15. The memory of claim 11 further comprising instructions to store the second control bit in a register.

16. Apparatus for processing an output signal comprising:

a first memory storing a first control bit that specifies whether to assemble the output signal from multiple virtual tributary (VT) connections or handle the output signal as an synchronous transport signal (8T8) or administrative unit (AU) connection;

a circuit to check a state of the first control bit; and control circuitry that uses a second memory to switch a predetermined number of connection entries together based on the state of the first control bit;

a memory storing a second control bit that is associated with independent and concatenated payloads; and a circuit to cross-connect a second payload with a first payload if the second control bit is set.

17. The apparatus of claim 16 wherein the control circuitry is configured to handle the output signal as an STS connection when the first control bit is set.

18. The apparatus of claim 17 wherein the control circuitry is configured to assemble the output signal from multiple VT connections when the first control bit is not set.

19. The apparatus of claim 16 wherein the control circuit is configured to switch a predetermined number of payloads together based on the state of the second control bit.

* * * * *